United States Patent
Gulla et al.

(10) Patent No.: US 8,460,841 B2
(45) Date of Patent: Jun. 11, 2013

(54) GAS DIFFUSION ELECTRODES, MEMBRANE-ELECTRODE ASSEMBLIES AND METHOD FOR THE PRODUCTION THEREOF

(75) Inventors: Andrea Gulla, Malden, MA (US); Robert Allen, South Harwich, ME (US)

(73) Assignee: BASF Fuel Cell GmbH (DE)

( * ) Notice: Subject to any disclaimer, the term of this patent is extended or adjusted under 35 U.S.C. 154(b) by 1126 days.

(21) Appl. No.: 11/993,591

(22) PCT Filed: Jun. 30, 2006

(86) PCT No.: PCT/EP2006/006361
§ 371 (c)(1),
(2), (4) Date: Jun. 13, 2008

(87) PCT Pub. No.: WO2007/003363
PCT Pub. Date: Jan. 11, 2007

(65) Prior Publication Data
US 2010/0047667 A1    Feb. 25, 2010

Related U.S. Application Data

(60) Provisional application No. 60/695,984, filed on Jul. 1, 2005.

(51) Int. Cl.
H01M 8/00 (2006.01)
H01M 4/88 (2006.01)
B05D 5/12 (2006.01)

(52) U.S. Cl.
USPC ............................ 429/535; 502/101; 427/115

(58) Field of Classification Search
USPC .............. 117/92, 97, 103, 108; 427/115, 497, 427/523, 564; 429/40, 41, 44
See application file for complete search history.

(56) References Cited

U.S. PATENT DOCUMENTS

| | | | |
|---|---|---|---|
| 5,741,360 A * | 4/1998 | Goto et al. | 117/94 |
| 6,077,621 A * | 6/2000 | Allen et al. | 429/524 |
| 6,153,327 A | 11/2000 | Dearnaley et al. | |
| 6,673,127 B1 | 1/2004 | Allen et al. | |
| 7,141,328 B2 * | 11/2006 | Fukumoto et al. | 429/485 |
| 7,332,530 B2 | 2/2008 | Kiefer et al. | |
| 7,333,257 B2 * | 2/2008 | Reynolds et al. | 359/265 |
| 7,419,546 B2 | 9/2008 | Gulla et al. | |
| 7,601,216 B2 * | 10/2009 | Gulla et al. | 117/92 |
| 7,785,454 B2 | 8/2010 | Gulla et al. | |
| 2001/0033960 A1 * | 10/2001 | Cavalca et al. | 429/40 |
| 2004/0018937 A1 | 1/2004 | Trabold et al. | |
| 2004/0262227 A1 | 12/2004 | Kiefer et al. | |

(Continued)

FOREIGN PATENT DOCUMENTS
WO    WO-2005/124905 A1    12/2005

*Primary Examiner* — Ula C Ruddock
*Assistant Examiner* — Scott J Chmielecki
(74) *Attorney, Agent, or Firm* — Novak Druce Connolly Bove + Quigg LLP

(57) ABSTRACT

A method for forming a mixed metal coating on a gas diffusion medium substantially free of ionomeric components which includes the steps of subjecting an electrically conductive web to a first ion beam having an energy not higher than 500 eV, then to a second beam having an energy of at least 500 eV containing the ions of a first metal, and to at least a third beam having an energy of at least 500 eV containing the ions of a noble metal. The invention also relates to gas diffusion electrodes.

12 Claims, 1 Drawing Sheet

U.S. PATENT DOCUMENTS

| | | |
|---|---|---|
| 2005/0053820 A1 | 3/2005 | Calundann et al. |
| 2005/0074654 A1 | 4/2005 | Kiefer et al. |
| 2005/0084727 A1 | 4/2005 | Kiefer et al. |
| 2005/0118477 A1 | 6/2005 | Kiefer et al. |
| 2005/0118478 A1 | 6/2005 | Kiefer et al. |
| 2005/0147859 A1 | 7/2005 | Kiefer et al. |
| 2005/0175879 A1 | 8/2005 | Kiefer et al. |
| 2005/0181254 A1 | 8/2005 | Uensal et al. |
| 2005/0256296 A1 | 11/2005 | Kiefer et al. |
| 2006/0008690 A1 | 1/2006 | Uensal et al. |
| 2006/0166067 A1 | 7/2006 | Kiefer et al. |
| 2006/0183012 A1 | 8/2006 | Uensal et al. |
| 2006/0210881 A1 | 9/2006 | Calundann et al. |
| 2006/0234099 A1 | 10/2006 | Muellen |
| 2007/0102361 A1 | 5/2007 | Kiefer et al. |
| 2007/0292734 A1 | 12/2007 | Kiefer et al. |
| 2008/0026277 A1 | 1/2008 | Peterson et al. |
| 2008/0038624 A1 | 2/2008 | Belack et al. |

\* cited by examiner

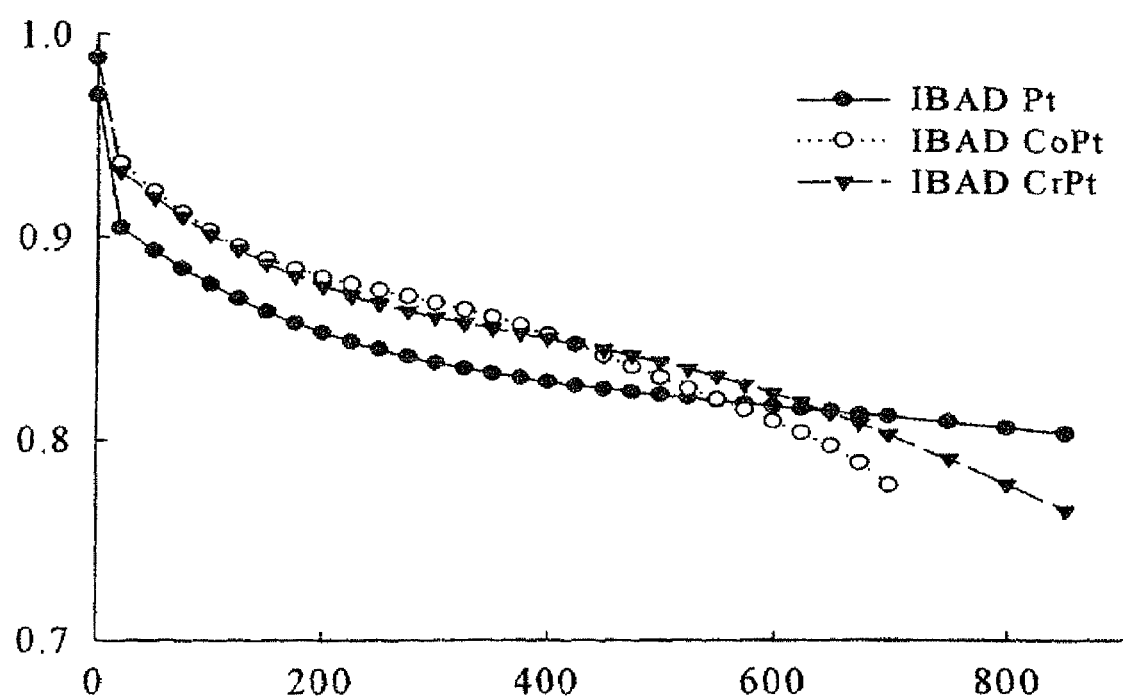

GAS DIFFUSION ELECTRODES, MEMBRANE-ELECTRODE ASSEMBLIES AND METHOD FOR THE PRODUCTION THEREOF

CROSS-REFERENCE TO RELATED APPLICATIONS

Related Applications

This application is a national stage application (under 35 U.S.C. 371) of PCT/EP2006/006361 filed Jun. 30, 2006, which claims benefit of U.S. Provisional Application 60/695,984 filed Jul. 1, 2005.

FIELD OF THE INVENTION

The invention is relative to gas diffusion electrodes for use in fuel cells and other electrochemical applications, and to the relevant method of production.

BACKGROUND OF THE INVENTION

Proton exchange membrane fuel cells (PEMFC) are considered to be one of the most promising sources of clean electrical energy for the near future. PEMFC are electrochemical generators which produce direct electrical current from a gaseous fuel (typically hydrogen, pure or in admixture) and a gaseous oxidant, normally consisting of oxygen or air. The core component of the cell is the membrane-electrode assembly, consisting of an ion-exchange membrane, which is the solid electrolyte supporting the whole process and the physical separator of the anode and cathode cell compartments, bonded or otherwise coupled to gas diffusion electrodes.

The gas diffusion electrodes, one cathode and one anode contacting either side of the ion-exchange membrane, usually comprise a gas diffusion medium and a catalyzed layer. Several kinds of technical solutions are known from the prior art for these components: the catalyzed layers are in some cases applied to the gas diffusion media prior to the coupling with the membrane, and/or they are directly coated on the membrane surface prior to the application of uncatalyzed gas diffusion media thereon. The gas diffusion medium usually comprises an electrically conductive web and one or more gas diffusion layers and the conductive web can be metallic or carbon-based, and may consist of a metal mesh, foam or cloth, of a woven or non-woven carbon cloth, of a carbon paper or of any other preferably porous or perforated medium.

Gas diffusion layers are provided to supply suitable paths for the diffusion of gaseous reactants inside the electrode structure toward the catalytic sites whereupon the electrochemical reactions of fuel oxidation (anode side) and oxidant reduction (cathode side) occur. They are usually based on mixtures of electrically conductive inert fillers (for instance carbon particles) and suitable, preferably hydrophobic binders (for instance PTFE or other fluorinated binders). Gas diffusion layers should be carefully designed to provide a permeable and smooth structure to ensure a correct apportionment of the gaseous reactants without incurring heavy mass transport penalties, and to provide a good contact with the membrane. Improved gas diffusion structures for fuel cells are for instance disclosed in U.S. Pat. No. 6,103,077. A catalyzed layer can then be applied to the gas diffusion layers, for instance as described in U.S. Pat. No. 6,017,650. Catalyzed layers of the prior art comprise noble metal catalysts such as platinum, optionally supported on carbon or graphite particles, a suitable binder, which can the same hydrophobic binder already present in the gas diffusion layers, and an ionomeric component, usually an ionomeric perfluorocarbon species. The ionomeric component can be added to the catalyst-binder mixture and/or it can be applied subsequently as an external layer wetting the pre-applied catalyst and binder particles.

Gas diffusion electrodes of this kind, coupled to proton-exchange membranes known in the art, for instance based on fluorocarbon acids such as Nafion® (a trade-mark of U.S. company DuPont), give rise to membrane-electrode assemblies characterized by excellent performances. Nevertheless, the noble metal component is exploited to such a low extent in structures of this kind, that very high specific loadings are required (usually in the range of 0.3 to 1 mg/cm2 of platinum, both for the anode and for the cathode side in commercially available products). The high amount of noble metal required for obtaining suitable performances in fuel cells is perhaps the single most important factor preventing PEMFC (and other types of fuel cells such as DMFC, direct methanol fuel cells) from having a commercial success.

Direct metallization of ion-exchange membranes with a catalyst layer has been proposed as a means to achieve a better catalyst-membrane interface, allowing a better catalyst exploitation and therefore, the use of lower noble metal loadings. However, no means for direct metallization of membranes has proven effective and practical up to now. High temperatures required by sputtering or ultra high vacuum deposition (UHV) are destined to impart consistent damages to the delicate ion-exchange membranes, and even the common physical and chemical vapor deposition techniques (PVD or CVD) have proven too difficult to control and cumbersome to scale up. A substantial improvement in the metallization of membranes is disclosed in U.S. Pat. No. 6,077,621, wherein the use of dual IBAD is proposed for this purpose. Dual IBAD, which is an evolution of the Ion Beam Assisted Deposition (IBAD) technique, has the advantage of being a low temperature process and very easy to scale up. The membrane is initially cleaned and textured by a first low-energy ion beam, for instance an Ar+ beam, having an energy not higher than 500 eV. A second beam is then focused on the membrane, containing higher energy ions (such as O2+ or N2+) together with the ions of the metals to be deposited, previously evaporated by means of an electron beam. Dual IBAD is much advantageous also over conventional IBAD (in which a single beam is used), in that it allows the formation of a better controlled film with the required density and porosity while imparting a minimum stress to the membrane structure.

Since the handling of a large sized ion-exchange membrane in a continuous metallization process is not very easy, a further improvement of this technique has been disclosed in U.S. Pat. No. 6,673,127. In this case, a very thin ion-exchange membrane layer is formed on a gas diffusion structure, and then subjected to dual IBAD. Although this technique allows to obtain high power densities in fuel cells with reduced platinum loadings, it still presents some disadvantages that the present invention wishes to address. Firstly, although the performances of these electrodes can be high, they can be somehow unpredictable since the reliability of this technique is affected by the characteristics of the ionomer film, which can vary according to the preparation conditions. The state-of-the-art liquid ionomer film is of fluorocarbonic nature, since this is the only known ionomeric material that would allow high power density operation, and it has to be recast from an alcoholic or hydroalcoholic suspension of a fluorocarbon acid such as the product commercialized as "Liquid Nafion" by DuPont. The nature of these suspensions is not always consistent, since average molecular weight, morphological parameters of the suspended articles, Theological parameters and other factors may vary in a remarkable fashion from one batch to the other. Moreover, also in the best cases, the utilization factor of the catalyst with liquid ionomer-embedded particles does never approach unity.

Liquid ionomers for gas diffusion electrodes were first described in U.S. Pat. No. 4,876,115 as a means for extending the proton conduction paths within the interstitial spaces of a three-dimensional catalytic layer thereby improving the utilization factor if the catalyst (which is a measure of the availability and accessibility of the catalyst itself as a site for the desired reaction). This approach is effective up to a certain extent, only mimicking the ideal situation whereby all the catalyst is present in a very thin and smooth, quasi-two-dimensional layer, in direct contact with the membrane surface. Besides solving the issue of lowering the platinum loading (or more generally the noble metal loading) in fuel cell electrodes, another problem which should be addressed is the low stability of fluorocarbon-based ionomeric components in membrane-electrode assemblies at certain process conditions. In some applications (such as automotive ones), fuel cells are operated in a discontinuous fashion depending on the instant power demand. Since PEMFC are known for their very quick start-up and their remarkable ability of following the requirements of steeply variable power demand, they are the most promising candidate for operating in this field.

However, in conditions of zero or near-zero power demand, i.e. when little or no current is generated (open circuit voltage conditions), a consistent generation of peroxides on the anode side is likely to take place. Perfluorocarbon materials are often unstable in these conditions, especially over long times. Also for this reason, alternative membranes (for instance based on polybenzimidazole, polyetherketetones or polysulfones) have been developed based for fuel cell applications. In any case, none of these materials has proven suitable for being employed as a proton conducting material for the electrode interface according to the teaching of U.S. Pat. No. 4,876,115, and perfluorocarbon materials such as the aforementioned "Liquid Nafion" are always used. The elimination of this component would therefore be beneficial for many reasons, not only of cost and reliability, but also of overall chemical stability at certain process conditions.

For all the above reasons, direct metallization of gas diffusion media was attempted with several different techniques in the past. U.S. Pat. No. 6,159,533 claims that excellent performances are obtainable with a PVD deposition of platinum on a gas diffusion medium, even though the examples show that the actual recorded performances don't go beyond a modest 732 mA/cm2 at 0.358 V in a fuel provided with a very thin membrane (20 microns), fed with a very high gas flow-rate (3.5 stoichiometric ratio on air, 2 stoichiometric ratio on pure hydrogen) at a relatively high pressure (about 2 bar).

A more interesting result was obtained with the invention disclosed in co-pending U.S. patent application Ser. No. 60/580,739, consisting of a gas diffusion medium free of ionomeric components provided with a noble metal coating by means of a dual IBAD deposition. The electrochemical performances detected in a fuel cell with this type of electrode and a Nafion 112 ion-exchange membrane (0.3 A/cm2 at about 0.8 V and 0.7 A/cm2 at about 0.7 V feeding pure hydrogen and air at 1.5 bar a, at a stoichiometric ratio of 2 and with a cell temperature of 80° C.) are certainly closer to those expected for a real industrial application. Some undesired limitations that were noticed with this type of electrode at higher current densities (around 1 A/cm2), were then solved by providing a patterned metal coating which enables a better use of the catalyst and an enhanced mass transport, as disclosed in the co-pending patent application Ser. No. 60/671,336, incorporated herein as reference.

More than one metal could be deposited with the method in accordance with the cited co-pending U.S. patent application Ser. No. 60/580,739 to obtain a mixed metal coating. In principle, it is sufficient to provide the second high energy beam with the ions of two or more distinct metals to have a corresponding metal co-deposition.

The importance of mixed metal coatings is commonly related to the properties of binary and ternary metal alloys in the field of electrocatalysis, for instance in imparting tolerance to carbon monoxide and other organic species in the oxidation of impure hydrogen feeds, or in enhancing the catalytic activity of platinum metal in the oxygen reduction reaction. While the method of U.S. patent application Ser. No. 60/580,739 may be useful, for instance, in the co-deposition of platinum and ruthenium for CO-tolerant fuel cell anodes, in which a fine and homogeneous dispersion of the two metals already provides the desired effect, an enhancement of the cathodic oxygen reduction is not observed with samples obtained by this method. Also the kinetics of oxidation of pure hydrogen are not enhanced by mixed metal coatings obtained by such method.

OBJECTS OF THE INVENTION

It is an object of the invention to provide a gas diffusion electrode comprising a preferably patterned mixed metal coating obtained by dual IBAD deposition of at least two metals on a gas diffusion medium overcoming the limitations of the prior art.

Under another aspect, it is an object of the invention to provide a gas diffusion electrode obtained by direct metallization of a gas diffusion medium comprising a low loading of one noble metal and of at least a second metal, characterized by high electrical performance and substantially free of ionomeric fluorocarbon components, and a membrane-electrode assembly incorporating the same.

In another aspect, it is an object of the invention to provide a method for forming a preferably patterned mixed metal coating on a gas diffusion medium by direct metallization.

These and other objects and advantages of the invention will become obvious from the following detailed description.

THE INVENTION

The inventors have surprisingly found that the best method for obtaining mixed metal coatings of high performances, especially in fuel cell applications, while retaining the benefits of the dual IBAD single metal coatings of the prior art comprises depositing the different metals in subsequent overlaid layers. The peculiar morphology of dual IBAD metal coatings, especially in the absence of ionomeric fluorocarbon components, is such that two overlaid layers of two distinct metals display electrochemical properties which are very similar to a true alloy of the same metals. Binary platinum-cobalt and platinum-chromium coatings obtained in this way have proven especially advantageous in fuel cell applications, but other combinations of two or more metals are included in the scope of the present invention.

Under one aspect, the method of the invention comprises subjecting an electrically conductive web to a first ion beam having an energy not higher than 500 eV, preferably comprised between 100 and 500 eV, then to a second beam having an energy of at least 500 eV, preferably between 500 and 2000 eV and containing the ions of a first metal, then to at least a third beam having an energy of at least 500 eV, preferably between 500 and 2000 eV and containing the ions of one noble metal. Subsequent high energy beams may be used for the deposition of other metal layers. In a preferred embodiment, the first metal is a transition metal, preferably cobalt or chromium, and the noble metal in the third beam is platinum.

In a preferred embodiment, prior to subjecting the electrically conductive web to the energy beams, a patterned mask, for instance a foraminous thin metal sheet or polymer film, is overlaid thereto so that a patterned coating is obtained. In a preferred embodiment, the patterned mask is obtained from a thin metal sheet by chemical etching. The preferred patterns are the same disclosed in the cited co-pending patent application Ser. No. 60/671,336 for single metal coating. For instance, the distance between the centers in adjacent couples of holes is preferably between 0.02 and 0.5 cm, and the preferred open ratio of the mask is comprised between 30 and 80%. Optionally, the patterned mask is a polygonal grid comprising equally spaced polygonal holes, preferably hexagonal, with a circular filled center so that the resulting mixed metal coating is comprised of equally spaced polygons, preferably hexagons, having a round hole center.
The preferred mixed metal coating has a total thickness between 5 and 250 nm and a loading of 0.01 to 0.3 mg/cm2.

In one preferred embodiment, the gas diffusion electrode of the invention comprises a gas diffusion medium essentially consisting of an electrically conductive web and a gas diffusion layer as known in the art. The conductive web can be, for instance, a carbon cloth or paper, and the gas diffusion layer optionally comprises one or more electroconductive fillers (for instance carbon particles) and at least one binder, preferably hydrophobic. In one more preferred embodiment, acetylene black carbon particles are used as the electroconductive filler in the gas diffusion layer. In another preferred embodiment, a fluorinated binder (e.g. PTFE) is used in the gas diffusion layer.

It is highly preferred that the gas diffusion layer be as smooth as possible, to exploit the patterned noble metal coating as much as possible by providing the best possible contact with the smooth surface of an ion-exchange membrane. In one preferred embodiment, the gas diffusion layer has a smoothness of at least 1000 Gurley-seconds. The gas diffusion electrode of the invention is used for the preparation of membrane-electrode assemblies comprising an ion-exchange membrane as known in the art. The exchange membrane may be coupled with one or two gas diffusion electrodes of the invention in intimate contact with one side thereof or with either sides, respectively. Such intimate contact is preferably obtained by hot-pressure bonding.

The invention will be hereafter better clarified making use of the following drawings, which are not intended to limit its scope.

BRIEF DESCRIPTION OF THE DRAWINGS

FIG. 1 reports the steady-state polarization curves in a fuel cell setup of two gas diffusion electrodes of the invention compared to one of the prior art.

EXAMPLE

Dual-IBAD was used to directly deposit mixed metal catalytic coatings onto a commercially available gas diffusion layer (LT1400, supplied by De Nora North America/U.S.A.). The gas diffusion layer design consisted of a 3 dimensional woven web structure comprised of a carbon cloth support as a substrate with a coating of PTFE-treated carbon. Such a gas diffusion layer has also improved tensile properties and a surface roughness of 5500 Gurley-seconds, which is perfectly suited for such superficial metal deposition obtained through IBAD.

The sample was subjected to a low-energy ion beam (200 eV) to clean and texture the surface, then to two subsequent high energy beams (500 to 2000 eV) containing the ions of two distinct metals; the first one (giving rise to a metal layer directly on top of the gas diffusion layer) contained either Co or Cr ions while the second one (used for depositing another metal layer directly on top of the first metal layer) contained Pt ions. All layers deposited had a pre-chosen thickness of 55 nm, thus giving a total precious metal loading of about 0.08 mg/cm2.

A control sample was also prepared using the same thickness and loading but depositing only a single layer of platinum directly on top of the gas diffusion layer.

The corresponding membrane-electrode assemblies (MEA) were prepared using a Nafion® 112 membrane supplied by DuPont/U.S.A. Prior to MEA fabrication, the membrane was cleaned by immersion in boiling 3% H2O2 for 1 hour followed by boiling in 1M H2SO4 for the same duration with subsequent rinsing in boiling deionized water (1 hour). The MEA was fabricated via hot pressing at 140° C. for 5 minutes, at a relative pressure of 2.106 Pa. No addition of liquid ionomer has been used in the MEA manufacture assembly.

All MEAs were tested in a 5 cm2 fuel cell (Fuel Cell Technologies/U.S.A.) using a fuel cell test station designed to carry out steady-state polarization measurements. This cell allowed for simultaneous measurements of both single and half cell data with the aid of reference electrodes in the anode chamber (hydrogen reference). The fuel cell test station also allows independent control of humidification, cell temperature and gas flow rate. All MEAs were conditioned prior to testing using a series of steps. The initial step involved a so-called "break-in" process in which the cell temperature is slowly raised (approximately 20° C./hr) from ambient to operative temperature under N2. After keeping the cell under these conditions for approximately 5 hours to allow proper conditioning of the MEA assembly, the relative pressure was slowly increased to 350/400 kPa (anode/cathode respectively). The gases were then switched to saturated H2 and air and the cell was allowed to equilibrate for a couple of hours.

The steady-state polarization data obtained under these conditions are reported in FIG. 1, wherein (1) is the curve relative to the pure Pt control sample, (2) is the curve of the CoPt sample and (3) is the one of the CrPt sample. From these data, a definite gain in catalytic activity is evident for the mixed metal coatings. The extent of this gain matches the one expected for Pt alloyed with Co or Cr. These depositions in distinct overlaid layers are then surprisingly able to behave like true alloys. A similar gain can be observed also for patterned coatings, similar to those described in the cited co-pending U.S. patent application Ser. No. 60/671,336, adding the benefits of a more exposed catalyst with improved mass transport characteristics to those of the layered mixed coatings of the present invention.

Various modifications of the electrodes and method of the invention may be made without departing from the spirit or scope thereof and it is to be understood that the invention is intended to be limited only as defined in the appended claims.

The invention claimed is:
1. A method for forming a mixed metal coating on a gas diffusion medium substantially free of ionomeric components which comprises subjecting an electrically conductive web to a first ion beam having an energy not higher than 500 eV, then to a second beam having an energy of at least 500 eV containing the ions of a first metal, and to at least a third beam having an energy of at least 500 eV containing the ions of a noble metal and wherein said first metal is cobalt or chromium and wherein the mixed metal coating is two overlaid layers of two different, distinct metals and is deposited on the gas diffusion medium which is substantially free of ionomeric components.

2. The method of claim 1, wherein prior to subjecting said electrically conductive web to said ion beams, a patterned mask is overlaid thereto to obtain a patterned mixed metal coating.

3. The method of claim 2, wherein said patterned mask is a thin metal sheet or polymer film provided with holes.

4. The method of claim 2, wherein said patterned mask is a chemically etched, thin metal sheet.

5. The method of claim 3, wherein the distance between the centers in adjacent couples of said holes is between 0.02 and 0.5 cm.

6. The method of claim 2, wherein said patterned mask has an open ratio between 30 and 80%.

7. The method of claim 2, wherein said patterned mask is a polygonal grid.

8. The method of claim 7, wherein said polygonal grid comprises equally spaced polygonal holes, with a circular filled center, and the resulting patterned noble metal coating is comprised of equally spaced polygons, having a round hole center.

9. The method of claim 1, wherein the mixed metal coating has a total thickness between 5 and 250 nm and a loading of 0.01 to 0.3 mg/cm2.

10. The method of claim 1, wherein said first ion beam has an energy between 100 and 500 eV and said second and third ion beams have an energy between 500 and 2000 eV.

11. The method of claim 1 wherein the noble metal is platinum.

12. The method of claim 8 wherein said polygons are hexagons.

* * * * *

UNITED STATES PATENT AND TRADEMARK OFFICE
CERTIFICATE OF CORRECTION

PATENT NO. : 8,460,841 B2  Page 1 of 1
APPLICATION NO. : 11/993591
DATED : June 11, 2013
INVENTOR(S) : Gulla et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1409 days.

Signed and Sealed this
Eighth Day of September, 2015

Michelle K. Lee
*Director of the United States Patent and Trademark Office*